United States Patent
Tomita

[19]

[11] Patent Number: 6,159,026

[45] Date of Patent: Dec. 12, 2000

[54] ELECTRICAL CARD CONNECTOR

[75] Inventor: Mitsuhiro Tomita, Tokyo, Japan

[73] Assignee: Hirose Electric Co., Ltd., Tokyo, Japan

[21] Appl. No.: 09/251,742

[22] Filed: Feb. 18, 1999

[30] Foreign Application Priority Data

Feb. 20, 1998 [JP] Japan .................................. 10-054168

[51] Int. Cl.[7] .................................................. H01R 13/62
[52] U.S. Cl. .......................................................... 439/159
[58] Field of Search .................................... 439/157, 159, 439/160

[56] References Cited

U.S. PATENT DOCUMENTS

| | | | |
|---|---|---|---|
| 5,364,282 | 11/1994 | Tondreault | 439/157 |
| 5,368,493 | 11/1994 | Obrien et al. | 439/160 |
| 5,383,789 | 1/1995 | Watanabe | 439/159 |
| 5,564,936 | 10/1996 | David et al. | 439/157 |
| 5,571,025 | 11/1996 | Arai et al. | 439/160 |
| 5,688,134 | 11/1997 | Hirata | 439/159 |

*Primary Examiner*—Paula Bradley
*Assistant Examiner*—Briggitte R. Hammond
*Attorney, Agent, or Firm*—Kanesaka & Takeuchi

[57] ABSTRACT

An electrical card connector comprises a connector body having an elongated housing body (2) in which a plurality of contact elements (1) are provided for electrical connection with a card P and a pair of guide arms (3) extending rearwardly from opposite ends of the housing body and an ejector mechanism having a slider (8) movable along the guide arms and having an abutment portion (9A) for abutment with the front edge of the card P, characterized in that the ejector mechanism is provided with a temporary fixation device (10) for engagement with an engaging member (4B) of the housing body (2) wherein the engaging between the temporary fixation device (10) and the engaging member (4B) is released by an operational force received by the slider (8).

6 Claims, 10 Drawing Sheets

PRIOR ART

ELECTRICAL CARD CONNECTOR

BACKGROUND OF THE INVENTION

1. Field of the Invention

The present invention relates to electrical card connectors for PC cards, compact flash cards, and memory cards.

2. Description of the Related Art

Figure 10:
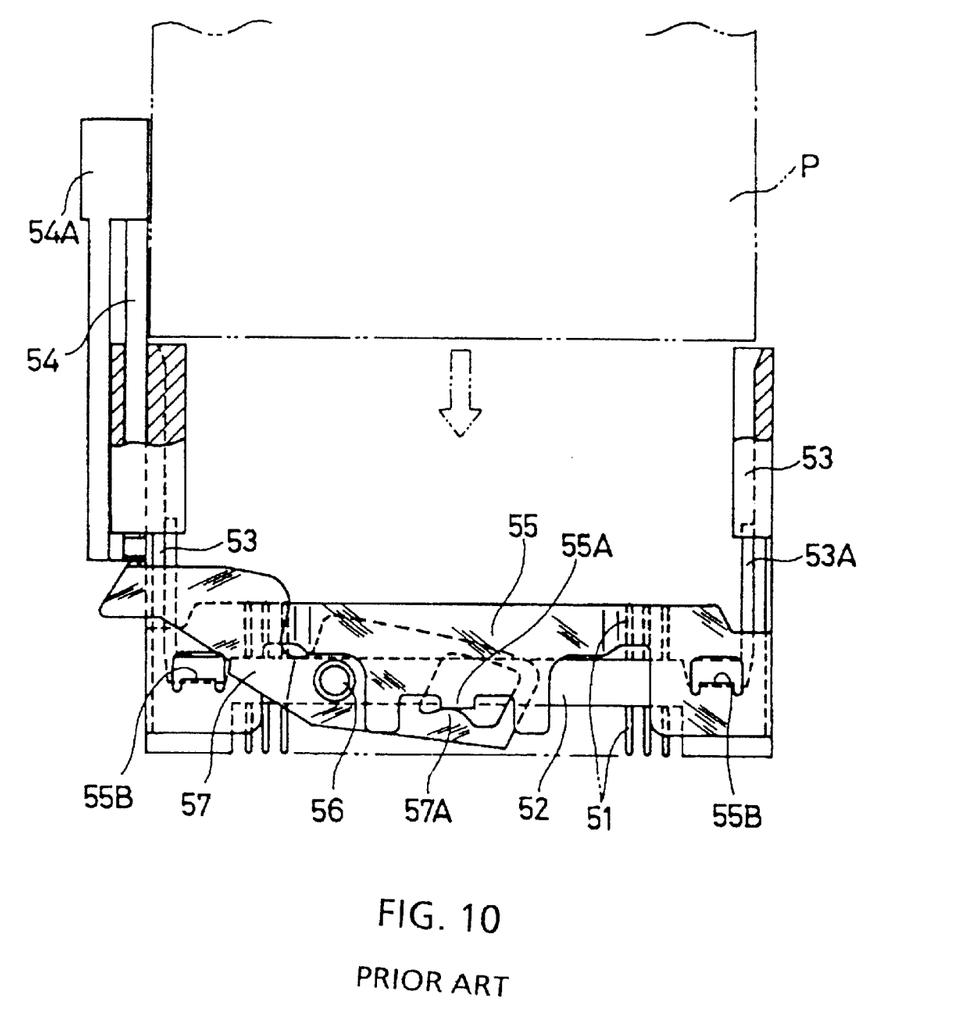
FIG. 10 is a plan view of a conventional electrical card connector.

FIG. 10 shows a connector of this type. The connector comprises an elongated housing body 52, a plurality of contact elements 51 provided in the housing body 52 for electrical contact with a card P, and a pair of guide arms 53 extending rearwardly from opposite ends of the housing body 52 for guiding the card P. The contact elements 51 extend through the housing body 52 with a predetermined pitch. The front ends of the contact elements 51 are bent in a direction perpendicular to the sheet and the rear ends project from the housing body. A pair of card guiding channels 53A are provided in the insides of the guide arms 53.

An ejector mechanism is provided on the connector body to eject the card P. The ejector mechanism comprises an ejector bar 54 movable along one of the guide arms 53 and having a push button 54A, a slider 55 movable along the housing body 52, and an ejector lever 57 rotatable at a fulcrum 56 and engageable with the slider 55. When the push button 54A is depressed, the ejector lever is rotated counterclockwise to push the abutment portion 57A of the slider 55 rearwardly.

The housing body 52 and the guide arms 53 are placed on a circuit board and the connection sections of the contact elements 51 are soldered to traces of the circuit board.

As shown by an arrow, the card P is pushed into the housing body while being guided by the guide arms 53 and connected to the contact sections of the contact elements 51. To eject the card, the push button 54A is depressed to move the ejector bar 54 and the ejector lever 57 so that the claw portions 55B of the slider 55 push the card P rearwardly to a card removal position.

As automatic assembling of electronic equipment advances, the connector is also automatically installed by a robot along with other electronic parts. The connector is brought to a predetermined position by the robot by applying a sucker to the central flat portion of the slider 55 where a center of gravity is located.

However, the slider 55 is movable along the housing body 52 and the guide arms 53 so that the position and angles or posture of the connector are unstable during the transportation by the robot. Consequently, the connector can be placed on a circuit board at a wrong position. If the guide arms are pulled up by the robot, the connector tends to be inclined because they are not the center of gravity.

In this way, the connector is not suitable for automatic assembling, and there is a demand for an improved connector.

SUMMARY OF THE INVENTION

Accordingly, it is an object of the invention to provide a connector suitable for automatic assembling by picking up the connector at the slider where its center of gravity is located.

An electrical card connector comprises a connector body for connection with a card and an ejector mechanism for ejecting the card from the connector body.

The connector body comprises an elongated housing body in which a plurality of contact elements are provided to make electrical connection with the card and a pair of guide arms extending rearwardly from opposite ends of the housing body.

The ejector mechanism comprises a slider movable along the guide arms and having an abutment portion for abutment with the front edge of the card.

According to the invention, the ejector mechanism comprises a temporary fixation device for engagement with an engaging member of the housing body. The engaging force is overcome by the operational force received by the slider to release the engagement. The release is made by a direct force applied to the slider or an operational force received by the slider upon operation of the elector mechanism or insertion or ejection of the card.

The temporary fixation device of the ejector mechanism is engaged with the engaging member of the housing body so that the ejector mechanism is immovable with respect to the housing body. Under this condition, when the sucker of a robot picks up the appropriate portion of the connector, the connector parts do not move relative to each other so that the posture and position of the connector become stable. Thus, it is possible to bring the connector to a predetermined position accurately.

After the connection sections of the contact elements are soldered to traces of a circuit board, the engagement between the temporary fixation device and the engaging member is released by the operational force of insertion or ejection of the card, enabling to use or remove the card.

It is possible to provide the engaging member on any part of the ejector mechanism, but it is preferred to provide it on the slider at which the center of gravity of the connector is likely located.

The temporary fixation device is provided at a position such that it is engaged with the housing body when it is outside the stroke of the slider between the front position where a card is inserted and the rear position where the card is ejected.

The temporary fixation device is provided with a weakened portion on the border with the slider body such that it is cut off from the slider body by the operational force upon release of the engagement and remains in the engaging member of the housing body.

It is preferred that the housing is provided with a regulation shoulder to prevent the temporary fixation device from reaching the engaging member but allow it to engage with the engaging member when the slider receives a force greater than the operational force, thereby preventing the released temporary fixation device from engaging again with the engaging member during the use of a card.

DESCRIPTION OF THE PREFERRED EMBODIMENT

Figure 1:
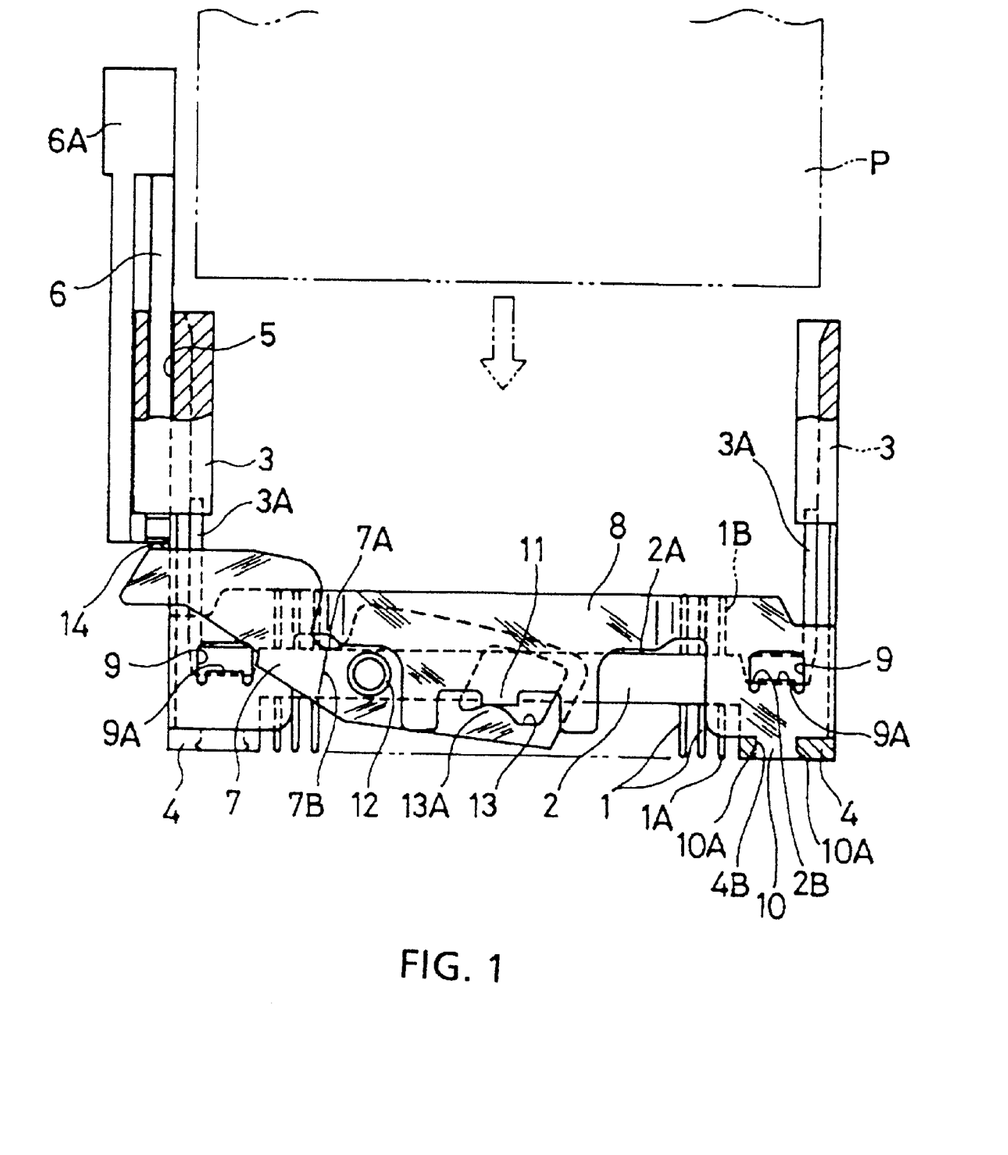
FIG. 1 is a plan view of an electrical card connector according to an embodiment of the invention, wherein temporary fixation is completed before a card is inserted.
Figure 2:
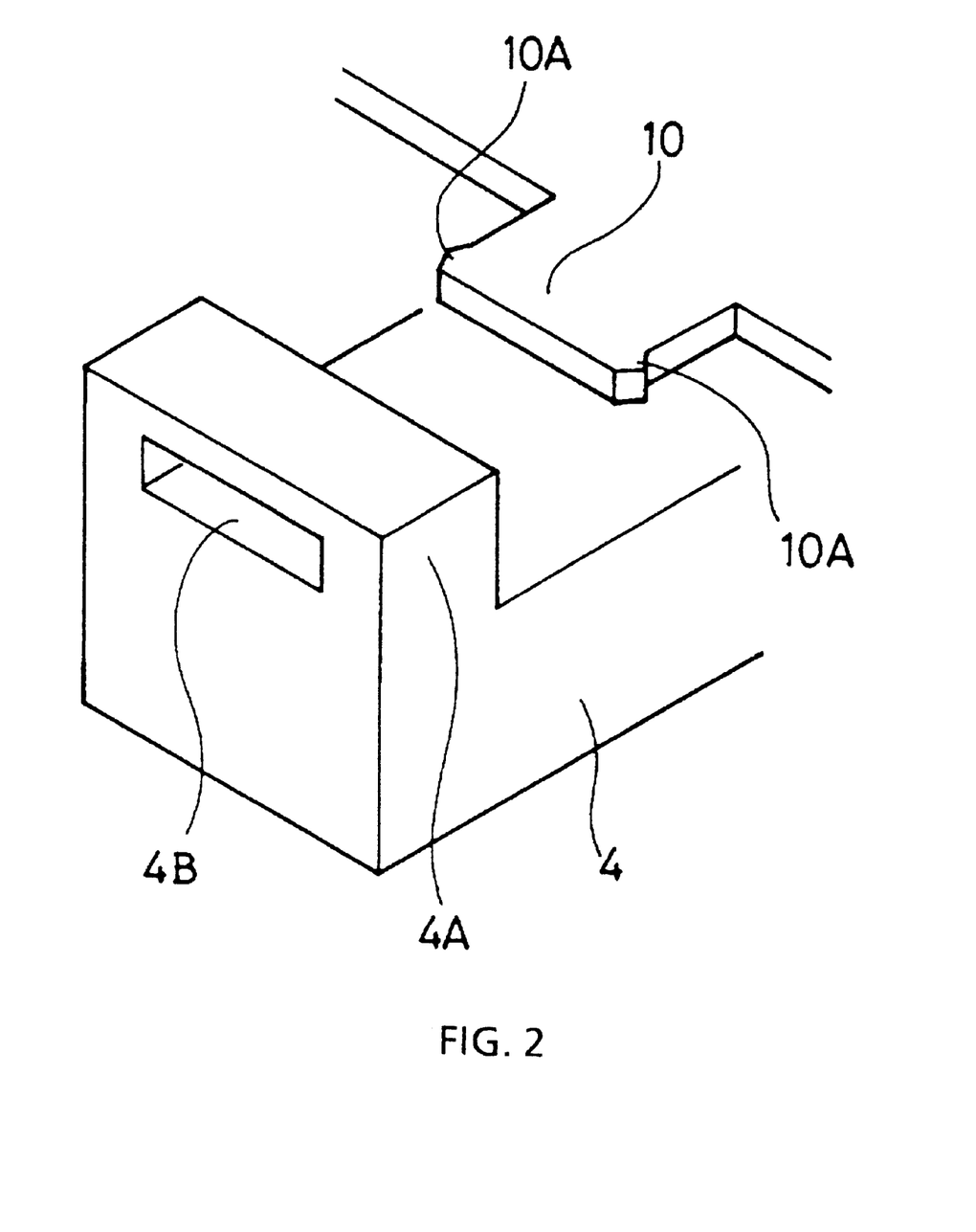
FIG. 2 is a perspective view of the temporary fixation device and the engaging member for the connector.

In FIG. 1, an electrical card connector including a connector body which comprises an elongated housing body 2, a plurality of contact elements 1 provided in the housing body 2, and a pair of guide arms 3 extending rearwardly from opposite ends of the housing body 2. A pair of extended sections 4 are provided on opposite front ends of the housing body 2. As shown in FIG. 2, the extended section 4 is provided with a upward projection 4A which has an engaging slot 4B.

As shown in FIG. 1, a plurality of contact elements extend through the housing body 2 between the extended sections 4 at predetermined intervals. The front ends of the contact elements 1 are bent in a direction perpendicular to the sheet to provide connection sections 1A and the rear ends project rearwardly to provide contact sections 1B for contact with a card P.

A pair of guiding channels 3A extend in the insides of the guide arms 3 for guiding a card. A guiding groove 5 is provided in one of the guide arms 3 for guiding an ejector bar hereinafter described.

The connector is provided with an ejector mechanism for ejecting a card. The ejector mechanism comprises an ejector bar 6, an ejector lever 7, and a slider 8. The ejector bar 6 is provided at the rear end with a push button 6A. When the connector is installed in electronic equipment, the push button 6A is located at a position such that the user can depress it along the guiding groove 5.

Figure 5:
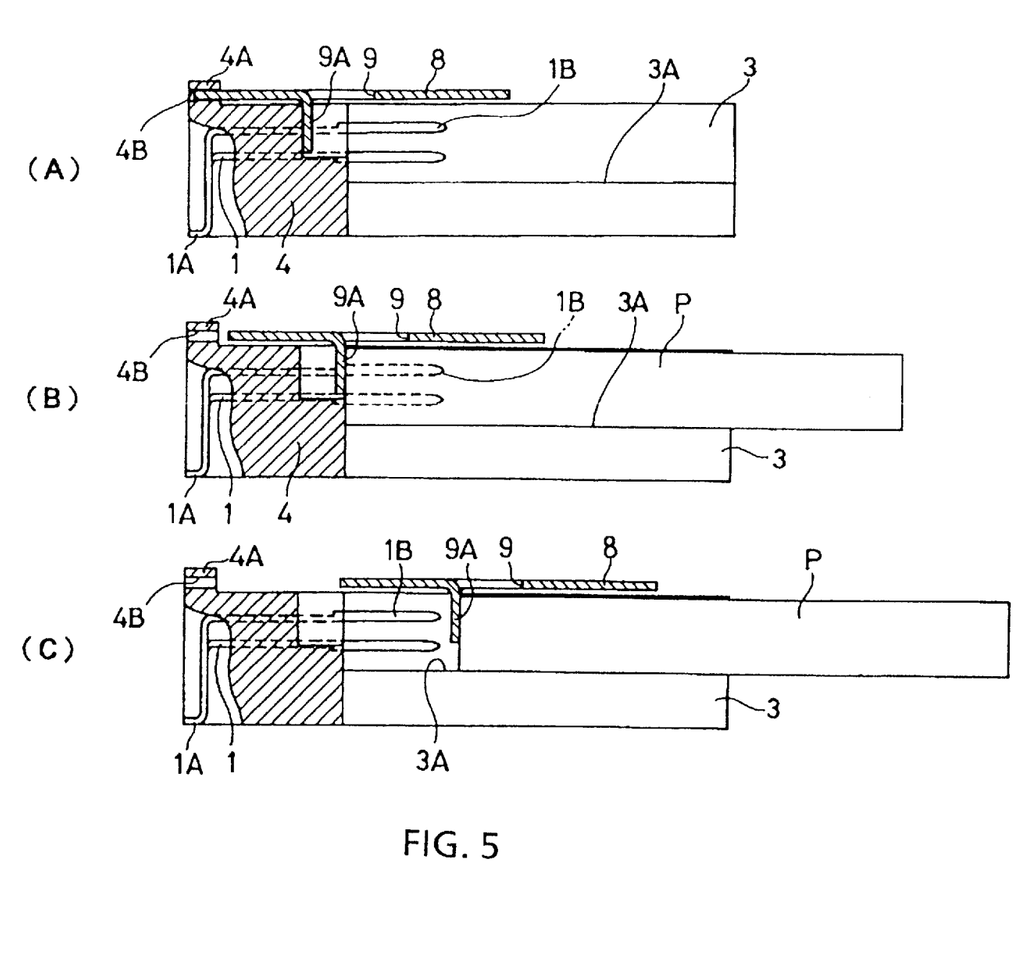
FIG. 5(A) is a sectional view of the connector wherein the temporary fixation is completed.
FIG. 5(B) is a sectional view of the connector wherein the temporary fixation is released.
FIG. 5(C) is a sectional view of the connector wherein the connection between the card and the connector is released.

The slider 8 has a U-shaped cross-section and is movable along the housing body 2. It is made by stamping and bending a sheet of metal to provide a pair of windows 9 at opposite ends, a pair of temporary fixation or stopper tabs 10 at the rear edge, and an abutment portion 11 at the middle position. As shown in FIG. 5(A), each window 9 is provided with a press tab 9A which is bent downwardly upon stamping. When the slider 8 is at the position shown in FIG. 1, the press tabs 9A are housed in recesses 2B formed in the rear face 2A of the housing body 2 which abuts against the front edge of a card P to define the front position of the card P. The abutment portion 11 has a straight front edge. As shown in FIG. 2, the stopper tabs 10 has a pair of stopper projections 10A on opposite sides. The distance between the stopper projections 10A is set to be slightly larger than the width of the engaging slot 4B of the housing body 2.

The ejector lever 7 is rotatably connected to the slider 8 with a caulking ring 12. The ejector lever 7 has a notch 7A and a shoulder 7B at which the ejector lever is bent to change the vertical position with respect to the slider 8. The ejector lever 7 is provided with a window 13 having an edge on which the abutment portion 13A is formed for abutment with the abutment portion 11 of the slider 8. A semicircular abutment portion 14 is provided at the other end of the ejector lever 7 for abutment with the front end of the ejector bar 6.

The connector is assembled and used as follows.

(1) When the slider 8 linked to the ejector lever 7 is incorporated in the housing body 2, the stopper tabs 10 of the slider 8 are pushed into the engaging slots 4B of the housing body so that the stopper projections 10A of the stopper tabs 10 cut into the engaging slots 4B to fix the position of the slider 8. See FIG. 5(A). That is, the slider 8 and the ejector 7 become immovable with respect to the housing body 2.

(2) When the connector is attached to a circuit board, it is held and brought to a predetermined position by the sucker of a robot. The sucker is applied to an appropriate position of the slider 8 (mostly, the central position near the center of gravity of the connector). Since the slider 8 is fixed to the housing body 2, it is not moved during the transportation by the robot. Thus, the connector is placed on the circuit board accurately at the predetermined position, and the connection sections 1A of contact elements 1 are soldered to correct traces of the circuit board.

(3) As shown in FIG. 1, when a card is used, it is put into the guide channels 3A of the guide arms 3 so that the front end of the card is brought into contact with the contact sections 1B of contact elements 1 and abutted against the rear face 2A of the connector body 2.

Figure 3:
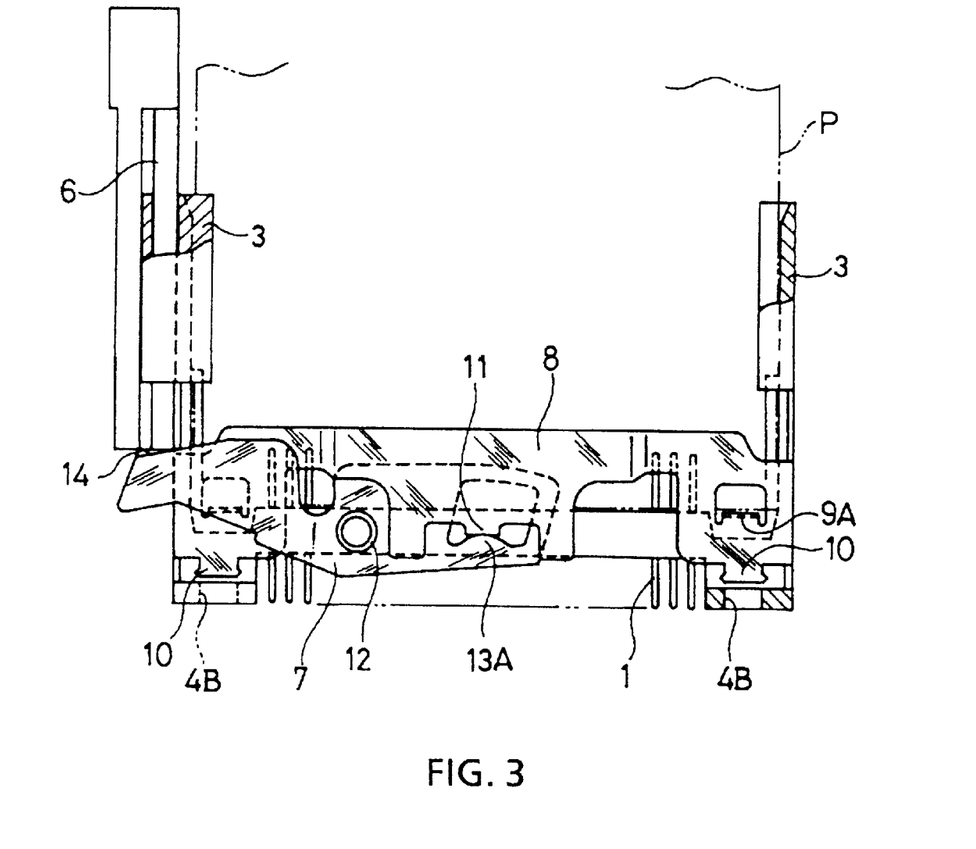
FIG. 3 is a plan view of the connector upon release of the temporary fixation.
Figure 4:
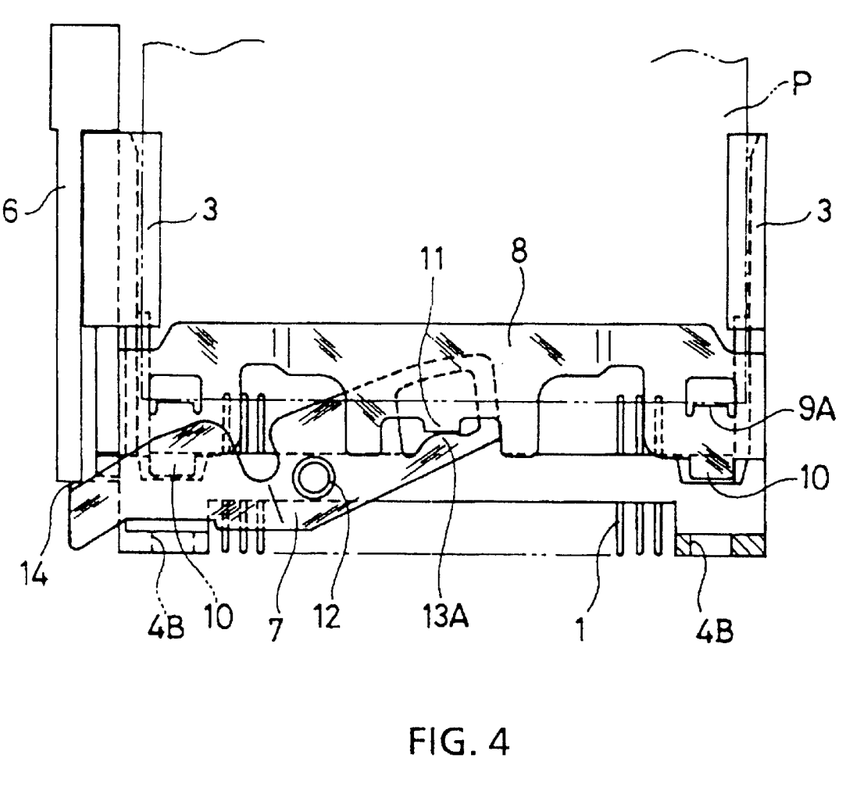
FIG. 4 is a plan view of the connector when the connection between the card and the connector is released.

(4) To eject the card, the push button 6A of the ejector bar 6 is pushed forwardly to advance the ejector bar 6, which pushes the abutment portion 14 of the ejector lever 7, rotating counterclockwise the ejector lever 7 about the caulking ring 12. The abutment portion 13A of the ejector lever 7 then pushes the abutment portion 11 of the slider 8. The stopper tabs 10 are released from the engaging recesses 4B by the ejector lever 7 (FIG. 5(B), and the slider 8 is pushed rearwardly as shown in FIG. 3.

(5) When the ejector bar 6 is further moved forwardly by the push button 6A, the abutment portions 9A of the slider 8 are moved to a position corresponding to the rear face 2A of the housing body 2 and abut against the front edge of the card P, which pushes the card P rearwardly to release the contact with the contact elements 1 and move the card P to a removal position. See FIG. 5(C). Now, the user is able to remove the card P.

(6) To insert a new card, the card moves the slider 8 forwardly by pushing the abutment portion 9. Since the slider does not move beyond the normal stroke determined by the distance between the insertion and removal positions of the card, the stopper members 10 do not engage the engaging recesses 4B.

Alternatively, the stopper members are provided on the ejector lever instead of the slider to temporarily fix the members of the ejector mechanism to the housing body.

Figure 6:
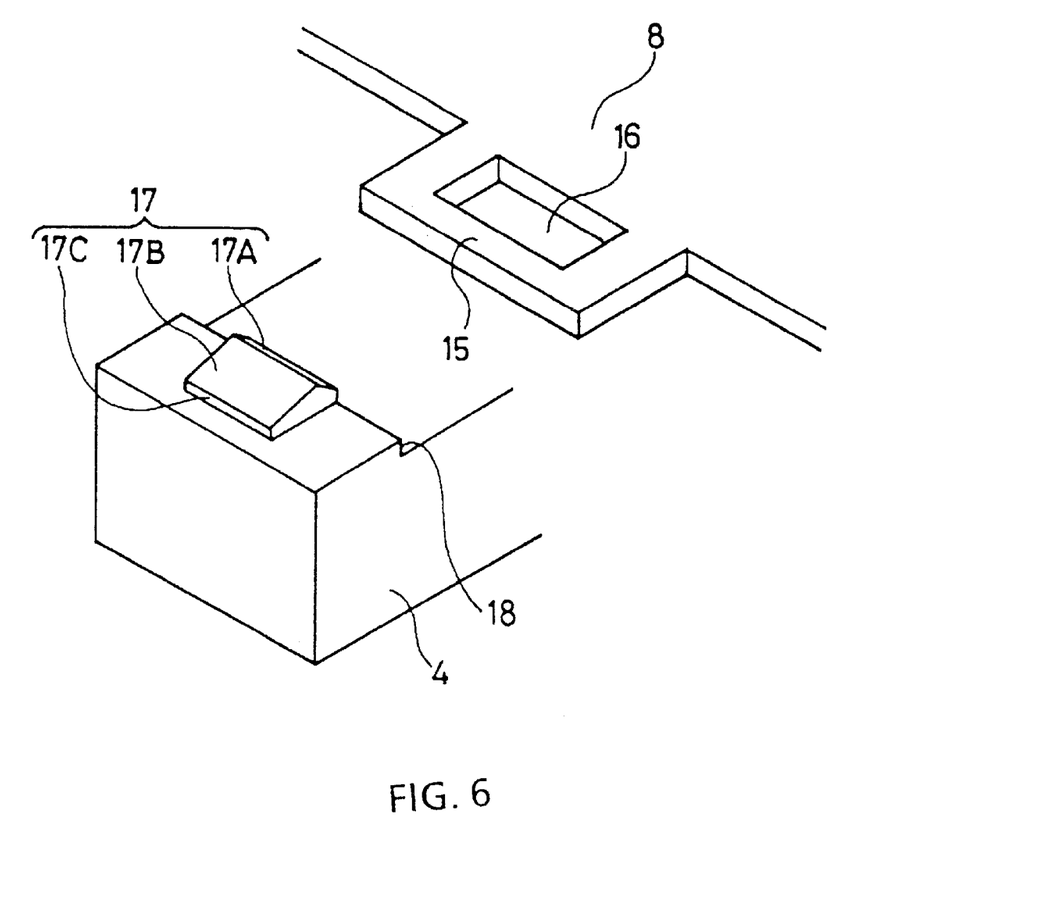
FIG. 6 is a perspective view of a temporary fixation device according to the second embodiment of the invention.

In FIG. 6, a stopper member 16 is provided in an protruded section 15 of the slider 8. An engaging member 17 is provided on the housing body 2 and made up of a pair of inclined surfaces 17A and 17B for engagement with the stopper window 16. When the slider 8 is pushed forwardly for temporary fixation, the protruded section 15 is moved over the inclined surface 17A so that the stopper window 16 engages the front side 17C of the engaging member 17 to fix the position of the slider 8. The engaging force is not necessary to be large but sufficient to prevent movement of the slider with respect to the housing body during the transportation. When the temporary fixation is released, the slider 8 receive a force higher than the above engaging force so that the protruded section 15 is moved rearwardly over the inclined surface 17B.

To prevent the stopper member 16 from being moved to the engaging member 17 for temporary fixation by an unexpected force, a regulation shoulder 18 is provided at the engaging member 17. Since the stopper member 16 must move over the shoulder 18 when temporary fixation is intended, the height of the shoulder 18 is set to be less than the thickness of the protruded section 15 of the slider.

Figure 7:
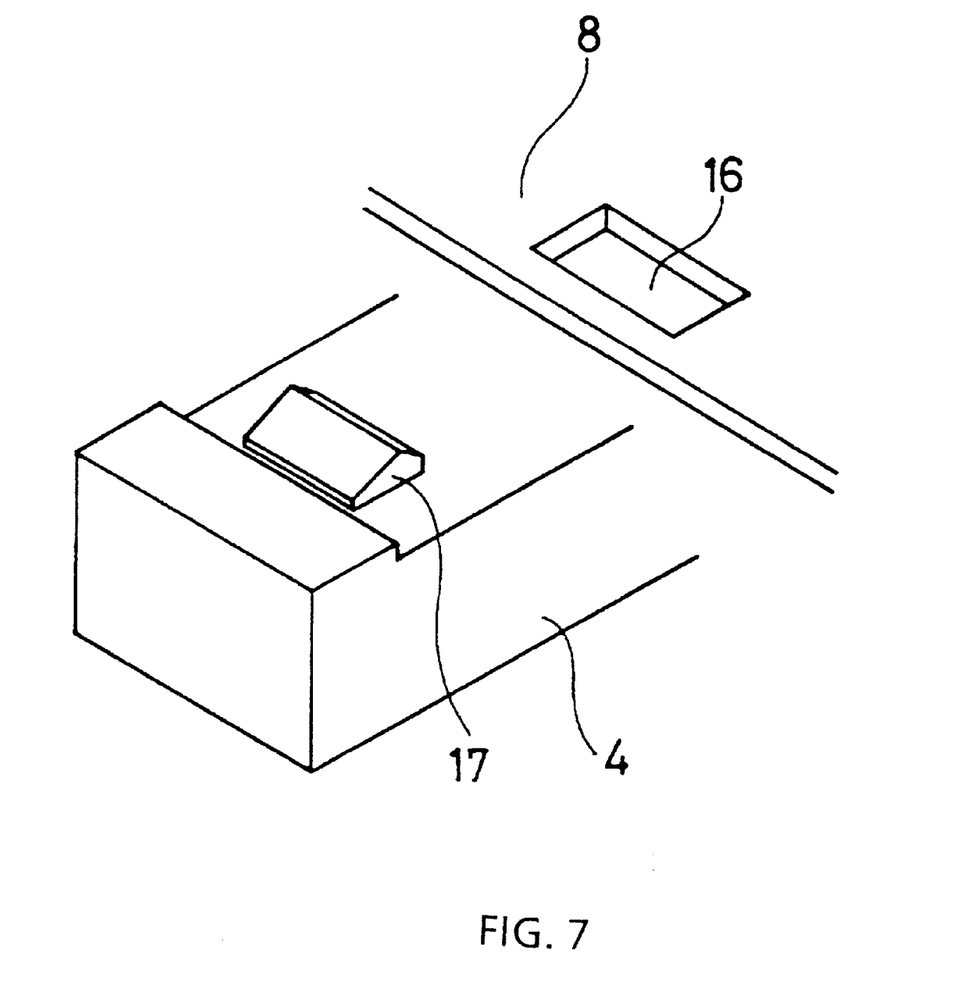
FIG. 7 is a perspective view of a temporary fixation device according to the third embodiment of the invention.

In FIG. 7, the stopper member 16 is provided near the front edge of the slider 8 to thereby minimize the length of the slider.

Figure 8:
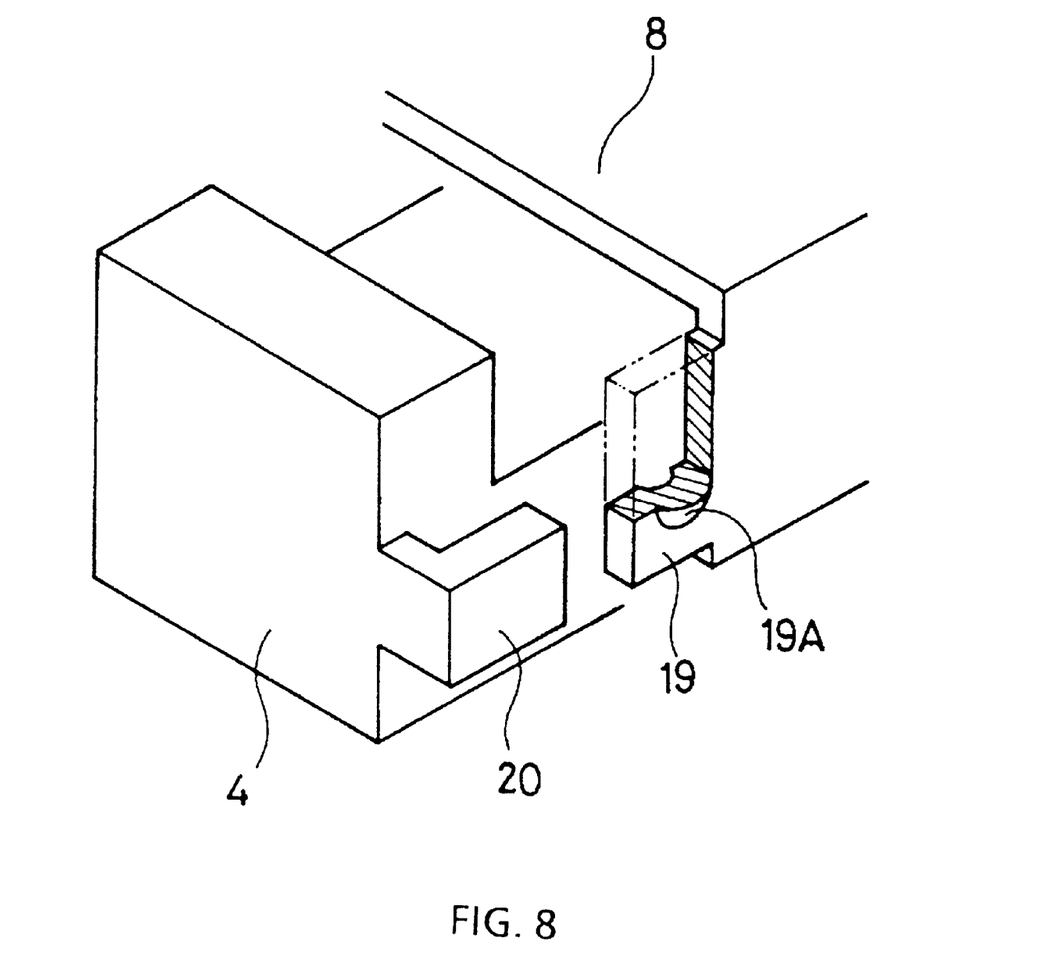
FIG. 8 is a perspective view of a temporary fixation device according to the fourth embodiment of the invention.

In FIG. 8, a stopper member 19 is provided on a side of the slider 8 and has a dimple for making the temporary fixation efficient. A flexible engaging arm 20 is provided on the housing body 2 to receiving the stopper member 19 with the dimple 19A. The temporary fixation is released by the rearward force applied to the slider upon insertion or ejection of the card.

The stopper member is engaged with the engaging member with a weak force so that when the slider or ejector receives a force greater than the weak force upon insertion or ejection of a card, the stopper member is moved over the engaging member for release. However, it is possible to release the temporary fixation by separating the stopper member from the slider body.

Figure 9:
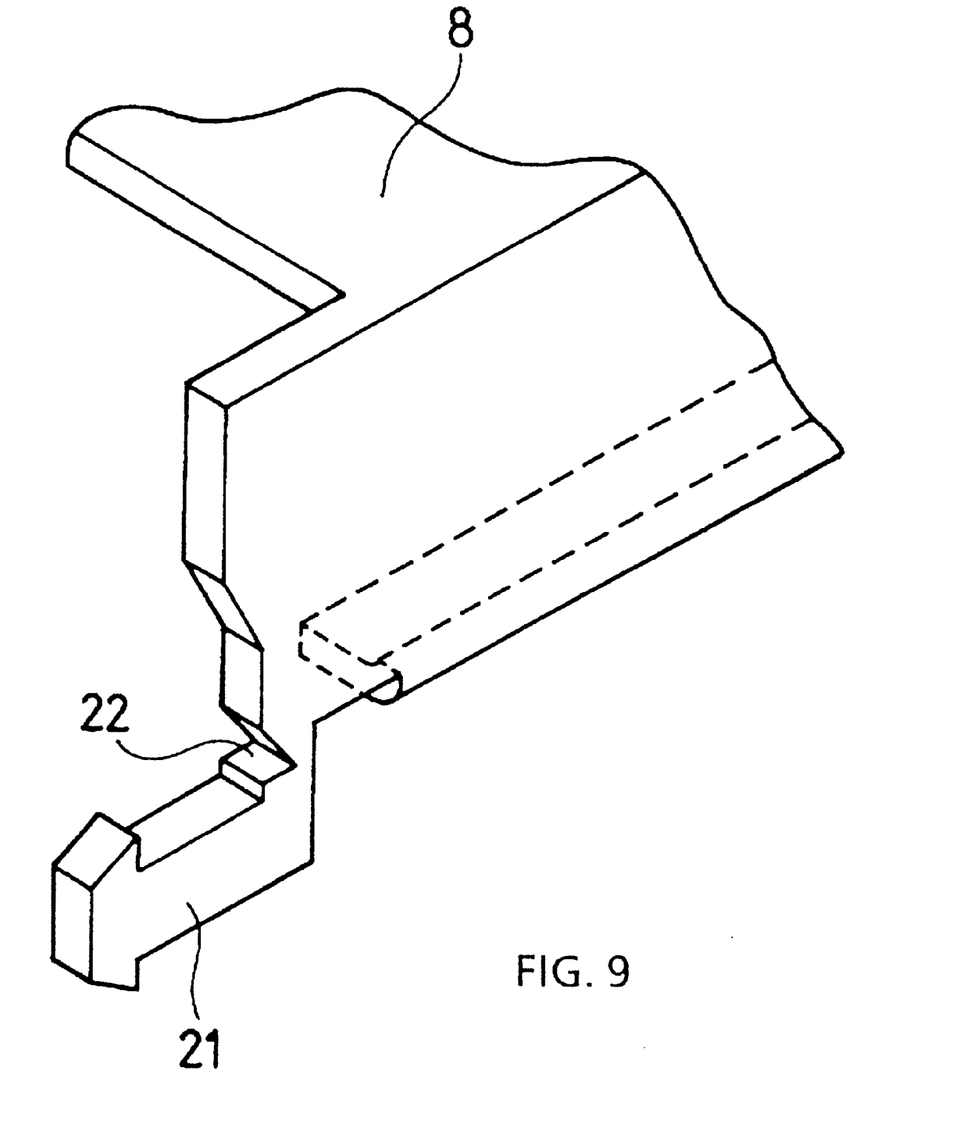
FIG. 9 is a perspective view of a temporary fixation device according to the fifth embodiment of the invention.

In FIG. 9, the slider 8 is provided with a temporary fixation hook 21 having a weakened portion or V-shaped notch 22 between the hook 21 and the slider body.

At initial temporary fixation of the slider 8, the temporary fixation hook 21 is pushed into the engaging member of the housing body for making temporary fixation. When the slider 8 receives a forward or rearward force upon insertion or ejection of a card upon release of the temporary fixation, the stopper member 21 is cut off from the slider body at the weakened portion 22 by the force. The stopper member 21 remains in the housing body. In this embodiment, when the temporary fixation is released after the connector is incorporated in the circuit board, the slider is not temporarily fixed by an unexpected force.

As in the embodiments of FIGS. 1–5, in the embodiments in FIGS. 6–8, the stopper member engages the engaging member when the slider is outside the normal stroke, but it is possible to engage the stopper member with the engaging member when the slider is inside the normal sliding range. Only one turn of temporary fixation and release is made in the former case but release is made every time a card is used in the latter case.

It is also possible to release the temporary fixation by applying a force directly without using the ejector mechanism or card insertion/ejection.

As has been described above, according to the invention, the ejector mechanism is temporarily fixed to the connector body and then subjected to automatic assembling on a circuit board so that it is possible to position accurately the connector on the circuit board to thereby increase the assembling efficiency and improve the product quality.

What is claimed is:

1. An electrical card connector comprising:

an elongated housing having an engaging member;

a plurality of contact elements extending through said elongated housing for electrical contact with a card;

a pair of guide arms extending rearwardly from opposite ends of said elongated housing; and a means for ejecting said card, said means comprising:

a slider movable along said guide arms and having an abutment portion for abutment with a front edge of said card;

temporary fixation means for engagement with said engaging member with an engaging force which is less than an operational force received by said slider to thereby release said engagement when said slider is outside a range of stroke between a front position of said slider where said card is inserted and a rear position of said slider where said card is ejected.

2. The electrical card connector according to claim 1, wherein said temporary fixation means extend from said slider.

3. The electrical card connector according to claim 1, wherein said temporary fixation means is provided with a weakened portion such that it remains in said engaging member of said housing when it is cut off from said slider by said operational force.

4. The electrical card connector according to claim 1, wherein said engagement between said temporary fixation means and said engaging member is released by an operational force of said slider, an insertion force of said card, or an ejection force of said card.

5. The electrical card connector according to claim 4, wherein said temporary fixation means is provided on said slider.

6. The electrical card connector according to claim 5, wherein said housing is provided with a regulation shoulder to prevent with a preventive force said temporary fixation means from reaching said engaging member but allow said temporary fixation means to engage with said engaging member when said shoulder receives a force greater than said preventive force.

* * * * *